L. N. VINCENT.
GREASE CUP.
APPLICATION FILED OCT. 1, 1913.
1,115,623.
Patented Nov. 3, 1914.
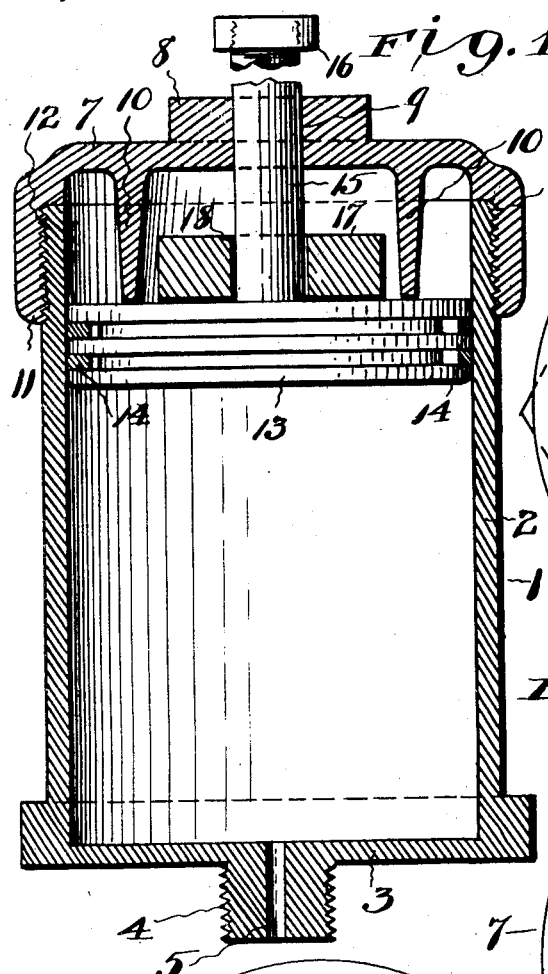
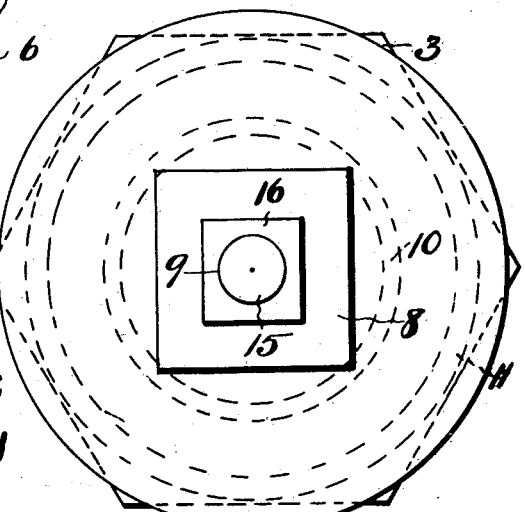
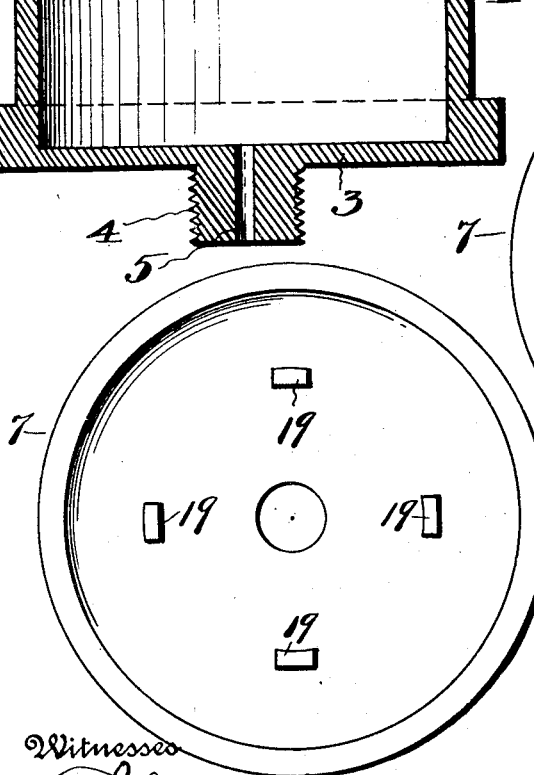
Inventor
Louis N. Vincent
by Blackwood Bros,
Attorneys

UNITED STATES PATENT OFFICE.

LOUIS N. VINCENT, OF PRESCOTT, ARIZONA.

GREASE-CUP.

1,115,623.  Specification of Letters Patent.  Patented Nov. 3, 1914.

Application filed October 1, 1913. Serial No. 792,761.

*To all whom it may concern:*

Be it known that I, LOUIS N. VINCENT, residing at Prescott, in the county of Yavapai and State of Arizona, a citizen of the United States, have invented certain new and useful Improvements in Grease-Cups; and I do hereby declare the following to be a full, clear, and exact description of the invention, such as will enable others skilled in the art to which it pertains to make and use the same.

My invention relates to improvements in grease cups particularly for use on the moving parts of machinery, for instance on the connecting rods of a locomotive.

The invention consists in the several features and combination of features as more fully hereinafter described and claimed.

It has for its object to provide means for automatically feeding the grease operated by the movement of the part of the machinery on which it is mounted.

It further has for its object to provide means whereby the feeding of the grease can be manually effected if so desired.

It further has for its object to provide reciprocal means for effecting the automatic feeding of the grease.

It has for a further object to provide means for spacing the follower from one end of the receptacle of the grease cup to allow for the movement of the reciprocable means.

It has for a further object to automatically increase the play of the reciprocable means and guide its movement.

It further has for its object to provide means whereby the height of the grease in the cup can be ascertained without necessitating the opening of the cup.

It further has for its object to provide automatic means for keeping the grease packed under pressure.

It still further has for its object to provide a grease cup which is simple, inexpensive and durable in construction and effective in use.

Referring to the drawings:—Figure 1 is a central vertical sectional view of my invention. Fig. 2 a top plan view. Fig. 3 a bottom plan view of the cover of the grease cup. Fig. 4 a bottom plan view of a modified form of cover.

In the drawings in which like reference characters denote like parts throughout the several views, 1 represents the grease cup, shown as cylindrical in form but which may be of any desired shape, which comprises a grease receptacle 2 with a bottom 3 provided with a screwthreaded projection 4 having a feed hole or channel 5 through which the grease is fed to the part to be lubricated.

The upper end of the grease receptacle is provided with screwthreads 6 and is closed by a cover 7 having a boss 8, a hole 9 extending through said boss and cover, a depending ring 10 and a flange 11 provided with screwthreads 12 engaging the screwthreads 6 and removably securing the cover in place on the receptacle.

A follower 13 is provided inside the receptacle 2 having spring packing rings 14 for the purpose of making a tight joint between the follower and the receptacle and a stem 15 extends upwardly from the follower through the hole 9 in the cover and boss and is provided at its upper end with a screw-nut 16.

A weight 17 is provided having a hole 18 therethrough by which it is adapted to be mounted on the stem 15 and is designed to be reciprocated thereon between the follower and the cover by the vibration of the moving part of the machinery on which the grease cup is mounted. It will be seen that as the follower moves downward, under the pressure of the weight, the extent of movement of the weight on the stem, between the follower and the cover, is automatically increased as its movement is limited by the follower and the cover.

The several parts of the grease cup may be made of any size or shape to suit the requirements of use.

In the modified form of cover, shown in Fig. 4, instead of having a ring depending from the cover a number of depending tapering lugs 19 are provided which serve the same purpose as the ring but make the cover lighter.

In operation the grease and the follower are placed in the grease receptacle, the cover screwed tightly on and the ring 10 projecting from the cover spaces the follower from the cover and thereby provides sufficient space for the weight to reciprocate between them, and as the grease cup is vibrated or reciprocated by the motion of the moving part of the machinery on which it is mounted the weight is caused to reciprocate between the follower and the cover and knocks against the follower which causes the grease to be expelled or fed from the grease receptacle, by the downward pressure of the follower, through the feed hole or channel 5 to the part to be lubricated.

If it is desired for any purpose to feed the grease when the cup is at rest, or even when moving, the stem of the follower can be pressed down by hand, by the use of a hammer or in any other way which will cause the follower to be pressed downward which will cause the grease to be expelled or fed through the hole or channel.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a grease cup, a grease receptacle, a cover, a follower, means extending from said cover into the grease receptacle and spacing the follower therefrom and a weight limited in its movement by said follower and the cover, substantially as described.

2. In a grease cup, a grease receptacle, a cover, a follower, means depending from said cover and spaced laterally therefrom, said means spacing the follower from said cover and a weight limited in its movement by said follower and the cover, substantially as described.

3. In a grease cup, a grease receptacle, a cover, a follower, a ring extending from said cover and spacing the follower therefrom and a weight limited in its movement by said follower and the cover, substantially as described.

4. In a grease cup, a grease receptacle, a cover, a follower having a stem extending through said cover, means extending from said cover into the grease receptacle and spacing the follower therefrom and a weight reciprocally mounted on said stem and limited in its movement by the follower and the cover, substantially as described.

5. In a grease cup, a grease receptacle, a cover, a follower having a stem extending through said cover, a weight reciprocally mounted on said stem and limited in its movement by said follower and the cover and a ring extending from said cover and spacing the follower therefrom, substantially as described.

In testimony whereof, I affix my signature in the presence of two witnesses.

LOUIS N. VINCENT.

Witnesses:
 CHAS. A. CHAMBERS.
 J. G. BROWN.